US008612739B2

(12) United States Patent
Ogura et al.

(10) Patent No.: US 8,612,739 B2
(45) Date of Patent: Dec. 17, 2013

(54) SYSTEM, APPARATUS, AND METHOD FOR INHIBITING OPERATION THAT MODIFIES PROGRAM CONFIGURATION

(75) Inventors: Yoshihiro Ogura, Kanagawa (JP); Mitsuo Nakamura, Kanagawa (JP); Tomoki Yoshida, Kanagawa (JP); Shunichi Maeda, Tokyo (JP); Hiroshi Kobayashi, Kanagawa (JP); Shingo Tamura, Kanagawa (JP); Keisuke Tsukada, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 414 days.

(21) Appl. No.: 12/972,720

(22) Filed: Dec. 20, 2010

(65) Prior Publication Data

US 2011/0161652 A1   Jun. 30, 2011

(30) Foreign Application Priority Data

Dec. 28, 2009  (JP) ................................. 2009-298671

(51) Int. Cl.
*G06F 15/177* (2006.01)
*G06F 9/00* (2006.01)

(52) U.S. Cl.
USPC ............ 713/100; 709/220; 709/221; 709/223

(58) Field of Classification Search
USPC ........................... 713/100; 709/220, 221, 223
See application file for complete search history.

(56) References Cited

U.S. PATENT DOCUMENTS

| 7,912,926 B2 * | 3/2011 | Belgaied et al. ............... 709/220 |
| 2005/0097543 A1 | 5/2005 | Hirayama |
| 2005/0141025 A1 | 6/2005 | Hanada |
| 2005/0262225 A1 * | 11/2005 | Halpern et al. ............... 709/220 |
| 2005/0289068 A1 | 12/2005 | Stefik et al. |
| 2007/0038983 A1 * | 2/2007 | Stienhans ..................... 717/127 |
| 2007/0168956 A1 | 7/2007 | Moore et al. |
| 2008/0005029 A1 | 1/2008 | Ando |
| 2008/0066084 A1 * | 3/2008 | Akiyoshi et al. ............... 719/321 |

(Continued)

FOREIGN PATENT DOCUMENTS

| CN | 101667236 A | 3/2010 |
| EP | 1398948 | 3/2004 |

(Continued)

OTHER PUBLICATIONS

Extended European search report dated Oct. 18, 2012.
Chinese Office Action dated Apr. 1, 2013.
Japanese Office Action dated Jun. 4, 2013.

*Primary Examiner* — Kim Huynh
*Assistant Examiner* — Zahid Choudhury
(74) *Attorney, Agent, or Firm* — IPUSA, PLLC (57) ABSTRACT

An operation inhibiting system includes an image forming apparatus in which programs are installed and an operation inhibition information providing apparatus, wherein the image forming apparatus includes a configuration information storing unit to store configuration information about the installed programs, an operation inhibition information acquiring unit to transmit the configuration information to the operation inhibition information providing apparatus, and to receive operation inhibition information that is transmitted from the operation inhibition information providing apparatus in response to the configuration information, the operation inhibition information indicating on a program-specific basis whether an operation to modify a configuration of an installed program is allowed, and an operation unit to inhibit the operation on the program based on the received operation inhibition information, wherein the operation inhibition information providing apparatus includes a unit that transmits the operation inhibition information responsive to the configuration information upon receiving the configuration information.

5 Claims, 12 Drawing Sheets

(56) References Cited

U.S. PATENT DOCUMENTS

| | | | |
|---|---|---|---|
| 2008/0133972 A1* | 6/2008 | Verbowski et al. | 714/37 |
| 2008/0196024 A1* | 8/2008 | Barfield et al. | 717/177 |
| 2009/0168668 A1* | 7/2009 | Kawai | 370/254 |
| 2010/0005291 A1* | 1/2010 | Hulten et al. | 713/156 |
| 2011/0016400 A1* | 1/2011 | Sakai | 715/735 |
| 2011/0131191 A1* | 6/2011 | Szyperski et al. | 707/702 |
| 2012/0151441 A1* | 6/2012 | Sharma et al. | 717/120 |
| 2012/0329443 A1* | 12/2012 | Bantz et al. | 455/418 |

FOREIGN PATENT DOCUMENTS

| | | |
|---|---|---|
| JP | 2000-339142 | 12/2000 |
| JP | 2004-252633 | 9/2004 |
| JP | 2005-135187 | 5/2005 |
| JP | 2006-031436 | 2/2006 |
| JP | 2006-069125 | 3/2006 |
| JP | 2008-016013 | 1/2008 |
| JP | 2010-113476 | 5/2010 |

* cited by examiner

| PACKAGE NAME | OPERATION INHIBITION INFORMATION |
|---|---|
| PACKAGE A | REMOVAL PROHIBITED |
| PACKAGE B | REMOVAL ALLOWED |
| PACKAGE C | REMOVAL ALLOWED |

| PACKAGE NAME | PRODUCT ID | VERSION NO. | FILE SIZE | ... |
|---|---|---|---|---|
| PACKAGE A | 111111 | 1.0 | 2M | ... |
| PACKAGE B | 222222 | 1.0 | 3M | ... |
| PACKAGE C | 333333 | 1.0 | 4M | ... |
| PACKAGE D | 444444 | 2.0 | 7M | ... |

FIG.8

| PACKAGE NAME | VERSION NO. |
|---|---|
| PACKAGE A | 1.0 |
| PACKAGE B | 1.0 |
| PACKAGE C | 1.0 |
| PACKAGE D | 2.0 |

FIG.9

| NUMBER | DEVICE CONFIGURATION INFORMATION | OPERATION INHIBITION INFORMATION ||
|---|---|---|---|
| 1 | PACKAGE A(1.0) | PACKAGE A | REMOVAL PROHIBITED |
| 2 | PACKAGE A(1.0) PACKAGE B(1.0) | PACKAGE A | REMOVAL PROHIBITED |
| | | PACKAGE B | REMOVAL ALLOWED |
| 3 | PACKAGE A(1.0) PACKAGE B(1.0) PACKAGE C(1.0) | PACKAGE A | REMOVAL PROHIBITED |
| | | PACKAGE B | REMOVAL ALLOWED |
| | | PACKAGE C | REMOVAL ALLOWED |
| 4 | PACKAGE A(1.0) PACKAGE B(1.0) PACKAGE C(1.0) PACKAGE D(1.0) | PACKAGE A | REMOVAL PROHIBITED |
| | | PACKAGE B | REMOVAL ALLOWED |
| | | PACKAGE C | REMOVAL ALLOWED |
| | | PACKAGE D | REMOVAL ALLOWED |
| 5 | PACKAGE A(1.0) PACKAGE B(2.0) PACKAGE C(1.0) PACKAGE D(1.0) | PACKAGE A | REMOVAL ALLOWED |
| | | PACKAGE B | REMOVAL PROHIBITED |
| | | PACKAGE C | REMOVAL ALLOWED |
| | | PACKAGE D | REMOVAL ALLOWED |
| 6 | PACKAGE A(1.0) PACKAGE B(1.0) PACKAGE C(2.0) PACKAGE D(1.0) | PACKAGE A | REMOVAL PROHIBITED |
| | | PACKAGE B | REMOVAL ALLOWED |
| | | PACKAGE C | REMOVAL ALLOWED |
| | | PACKAGE D | REMOVAL ALLOWED |
| 7 | PACKAGE A(1.0) PACKAGE B(1.0) PACKAGE C(1.0) PACKAGE D(2.0) | PACKAGE A | REMOVAL ALLOWED |
| | | PACKAGE B | REMOVAL ALLOWED |
| | | PACKAGE C | REMOVAL ALLOWED |
| | | PACKAGE D | REMOVAL PROHIBITED |
| : | : | : | : |

| PACKAGE NAME | PACKAGE NAME OF DEPENDENT PACKAGE |
|---|---|
| PACKAGE A | PACKAGE B |
| PACKAGE C | PACKAGE B |
| .. | .. |

SYSTEM, APPARATUS, AND METHOD FOR INHIBITING OPERATION THAT MODIFIES PROGRAM CONFIGURATION

BACKGROUND OF THE INVENTION

1. Field of the Invention

The disclosures herein generally relate to operation inhibiting systems, image forming apparatuses, operation inhibition information providing apparatuses, and operation inhibiting methods, and particularly relate to an operation inhibiting system, an image forming apparatus, an operation inhibition information providing apparatus, and an operation inhibiting method that inhibit users from modifying a program configuration used in the image forming apparatus.

2. Description of the Related Art

Some image forming apparatuses referred to as multifunction devices or multifunction peripherals may allow programs to be installed or uninstalled after shipment (see Japanese Patent Application Publication 2008-16013, for example). Users modify the configurations of programs installed in image forming apparatuses in accordance with needs in work, thereby attaining improvements in work efficiency.

There are programs that should not be uninstalled by users due to reasons related to proper system operations. For example, some programs may have interdependency therebetween. Uninstalling a program that is depended upon makes unusable a program that depends on the uninstalled program. Interdependency between programs may differ depending on installed program configurations. This gives rise to a complicated situation in which programs that should not be uninstalled may differ from apparatus to apparatus.

Accordingly, it may be desirable to provide an operation inhibiting system, an image forming apparatus, an operation inhibition information providing apparatus, and an operation inhibiting method that can inhibit modification to the configuration of installed programs.

SUMMARY OF THE INVENTION

It is a general object of at least one embodiment of the present invention to provide an operation inhibiting system, an operation inhibition information providing apparatus, and an operation inhibiting method that substantially eliminate one or more problems caused by the limitations and disadvantages of the related art.

In one embodiment, an operation inhibiting system includes an image forming apparatus in which programs are installed; and an operation inhibition information providing apparatus, wherein the image forming apparatus includes: a configuration information storing unit to store configuration information about the installed programs; an operation inhibition information acquiring unit to transmit the configuration information to the operation inhibition information providing apparatus, and to receive operation inhibition information that is transmitted from the operation inhibition information providing apparatus in response to the configuration information, the operation inhibition information indicating on a program-specific basis whether an operation to modify a configuration of a corresponding one of the installed programs is allowed; and an operation unit to inhibit the operation on the programs based on the received operation inhibition information, wherein the operation inhibition information providing apparatus includes an operation inhibition information providing unit that transmits the operation inhibition information responsive to the configuration information upon receiving the configuration information.

In one embodiment, an apparatus for providing operation inhibition information includes an operation inhibition information providing unit that transmits operation inhibition information responsive to configuration information upon receiving the configuration information, the operation inhibition information indicating on a program-specific basis whether an operation to modify a configuration of a program specified in the configuration information is allowed.

In one embodiment, an operation inhibiting method, which is used in an operation inhibiting system including an operation inhibition information providing apparatus and an image forming apparatus in which programs are installed, includes: transmitting, by the image forming apparatus, configuration information about the installed programs stored in a configuration information storing unit to the operation inhibition information providing apparatus; receiving, by the image forming apparatus, operation inhibition information that is transmitted from the operation inhibition information providing apparatus in response to the configuration information, the operation inhibition information indicating on a program-specific basis whether an operation to modify a configuration of a corresponding one of the installed programs is allowed; inhibiting, in the image forming apparatus, the operation on the programs based on the received operation inhibition information; and transmitting, by the operation inhibition information providing apparatus, the operation inhibition information responsive to the configuration information upon receiving the configuration information.

According to at least one embodiment, an operation to modify the configuration of an installed program is properly inhibited.

BRIEF DESCRIPTION OF THE DRAWINGS

Other objects and further features of embodiments will be apparent from the following detailed description when read in conjunction with the accompanying drawings, in which.

DESCRIPTION OF THE PREFERRED EMBODIMENTS

Figure 1:
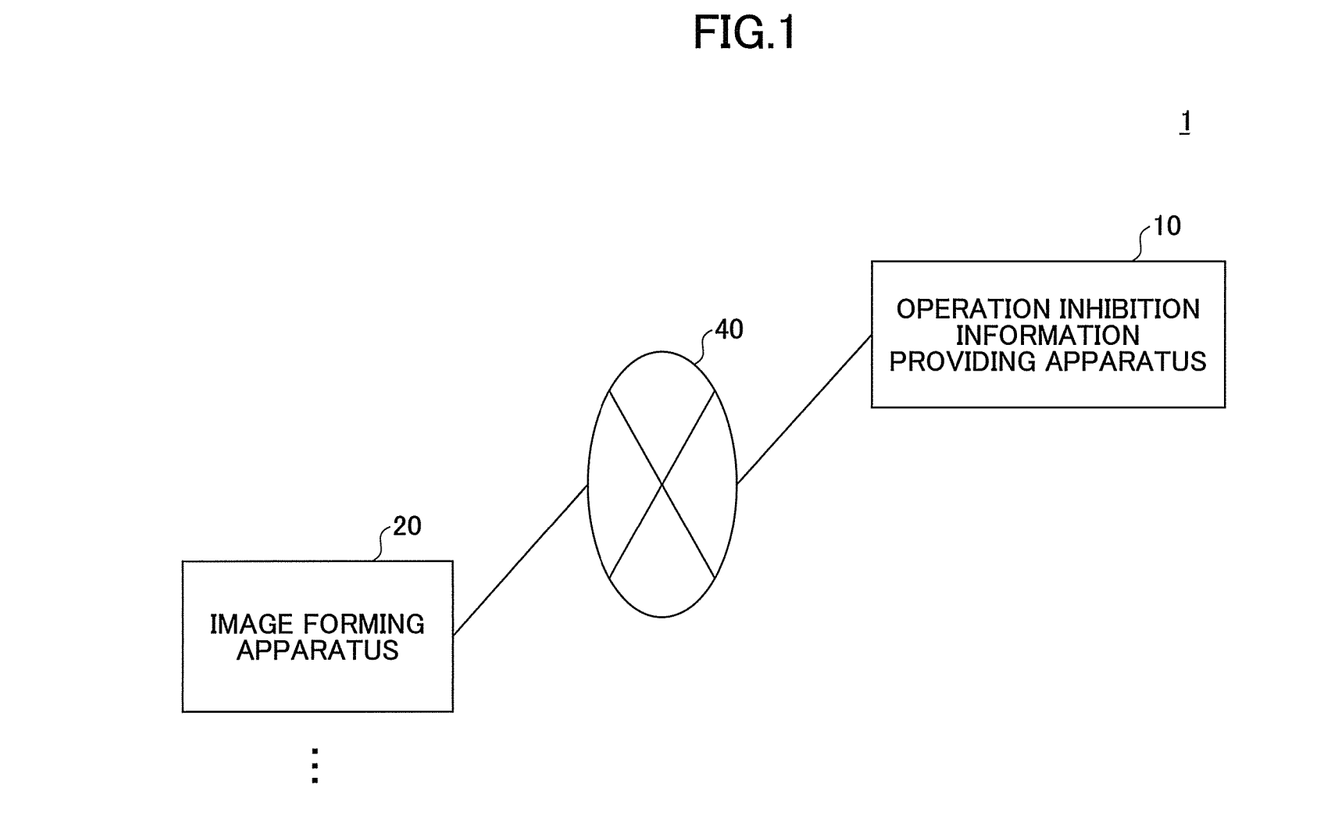
FIG. 1 is a drawing illustrating an example of an operation inhibiting system according to an embodiment.

In the following, embodiments of the present invention will be described with reference to the accompanying drawings. FIG. 1 is a drawing illustrating an example of an operation inhibiting system according to an embodiment. In an operation inhibiting system 1 illustrated in FIG. 1, an operation inhibition information providing apparatus and one or more image forming apparatuses 20 are connected to each other through a network 40 (which may be wired or wireless) such as the Internet. The operation inhibition information providing apparatus may be installed at the maker that manufactures the image forming apparatuses 20. The image forming apparatuses 20 are installed at user offices or the like.

The image forming apparatuses 20 may be multifunction devices that incorporate the functionality of multiple devices such as a copier, a facsimile machine, a printer, and a scanner in one device. Alternatively, the image forming apparatuses 20 may have only one function.

The operation inhibition information providing apparatus 10 is a computer that provides the image forming apparatuses 20 with information (hereinafter referred to as "operation inhibition information") that is used to inhibit (or restrain) users from performing an operation (hereinafter referred to as "configuration modify operation") modifying a program configuration in the image forming apparatuses 20. The image forming apparatuses 20 determine whether to allow a configuration modify operation to be performed on a program according to the operation inhibition information. Examples of the configuration modify operation include installing a program, uninstalling a program, and updating a program. Updating a program means replacing an installed old-version program with a new version of the same program. Uninstalling a program is not limited to the complete removal of an uninstalled program from the image forming apparatuses 20. The program codes may still remain in the image forming apparatuses 20 while the program is excluded from the list of usable programs.

Figure 2:
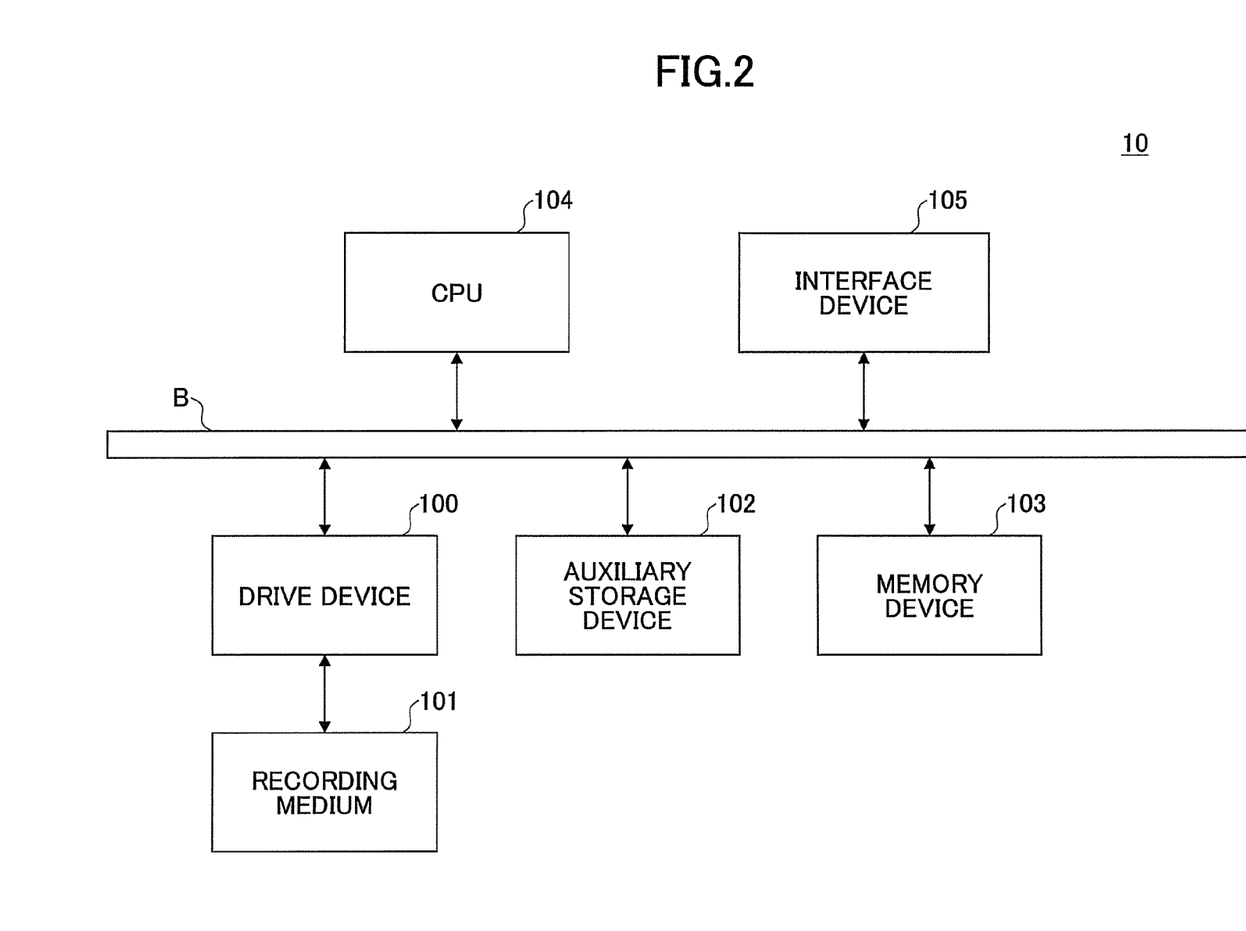
FIG. 2 is a drawing illustrating an example of the hardware configuration of an operation inhibition information providing apparatus according to the embodiment.

FIG. 2 is a drawing illustrating an example of the hardware configuration of the operation inhibition information providing apparatus according to the present embodiment. The operation inhibition information providing apparatus 10 illustrated in FIG. 2 includes a drive device 100, an auxiliary storage device 102, a memory device 103, a CPU 104, and an interface device 105, which are connected together via a bus B.

Programs for implementing the functions of the operation inhibition information providing apparatus 10 are provided in a recording medium 101 such as a CD-ROM. Upon setting the recording medium 101 containing programs to the drive device 100, the programs are installed from the recording medium 101 to the auxiliary storage device 102 through the drive device 100. The programs do not have to be installed from the recording medium 101, and may be downloaded from another computer through a network. The auxiliary memory device 102 stores the installed programs, and, also, stores various files and data.

The memory device 103 serves to store a program read from the auxiliary storage device 102 upon a request to execute the program. The CPU 104 serves to provide the functions (illustrated in FIG. 4) of the operation inhibition information providing apparatus 10 according to programs stored in the memory device 103. The interface device 105 serves to provide connection with the network.

Figure 3:
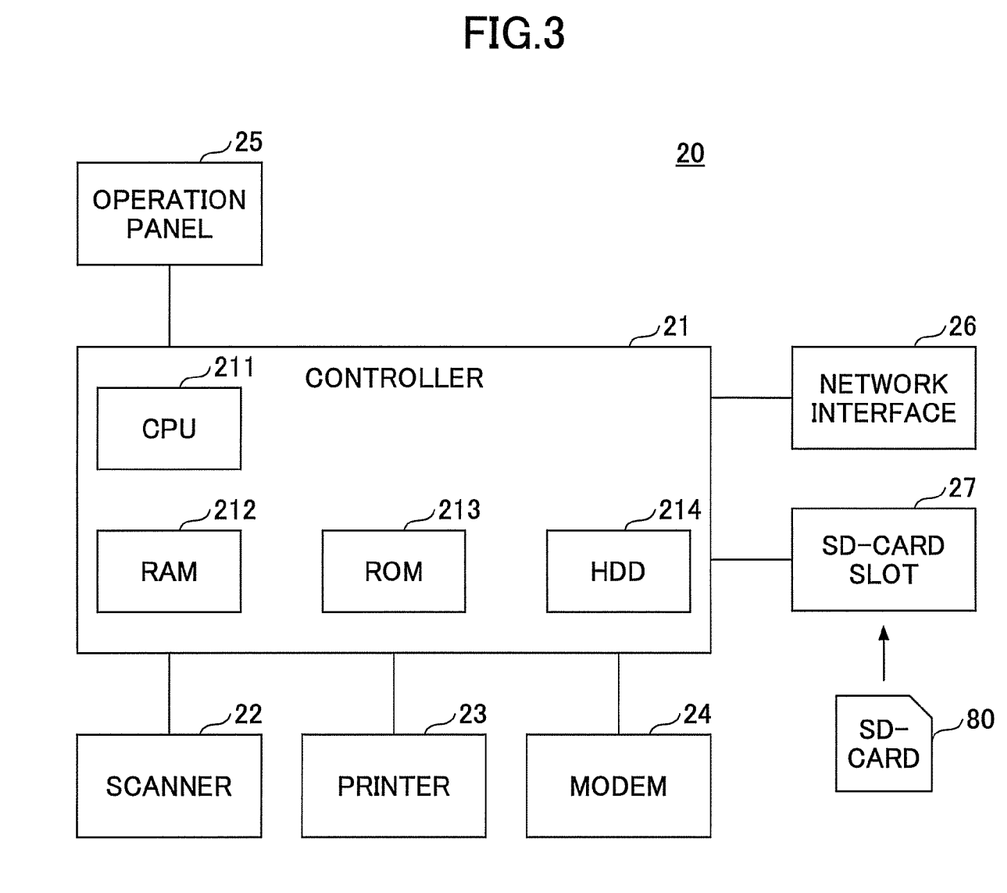
FIG. 3 is a drawing showing an example of the hardware configuration of an image forming apparatus according to the embodiment.

FIG. 3 is a drawing illustrating an example of the hardware configuration of an image forming apparatus according to the present embodiment. In FIG. 3, an image forming apparatus 20 includes hardware components such as a controller 21, a scanner 22, a printer 23, a modem 24, an operation panel 25, a network interface 26, and an SD-card slot 27.

The controller 21 includes a CPU 211, a RAM 212, a ROM 213, and an HDD 214. The ROM 213 stores therein various programs and data used by these programs, for example. The RAM 212 is used as a memory area to which programs are loaded, and is also used as a work area used by the loaded programs. The CPU 211 executes programs loaded to the RAM 212 to provide various functions. The HDD 214 stores therein programs and various types of data used by these programs, for example.

The scanner 22 is the hardware for scanning image data from a document. The printer 23 is the hardware for printing image data on a print sheet. The modem 24 is the hardware for connecting with a telephone line, and is used to exchange image data through facsimile communication. The operation panel is the hardware having an input unit such as buttons for receiving user inputs and a display unit such as a liquid crystal display panel. The network interface 26 is the hardware for connecting with a network (which may be wired or wireless). The SD-card slot 27 is used to read a program recorded in an SD card 80. In the image forming apparatus 20, not only a program stored in the ROM 213 but also a program stored in the SD card 80 is loaded to the RAM 212 for execution.

Figure 4:
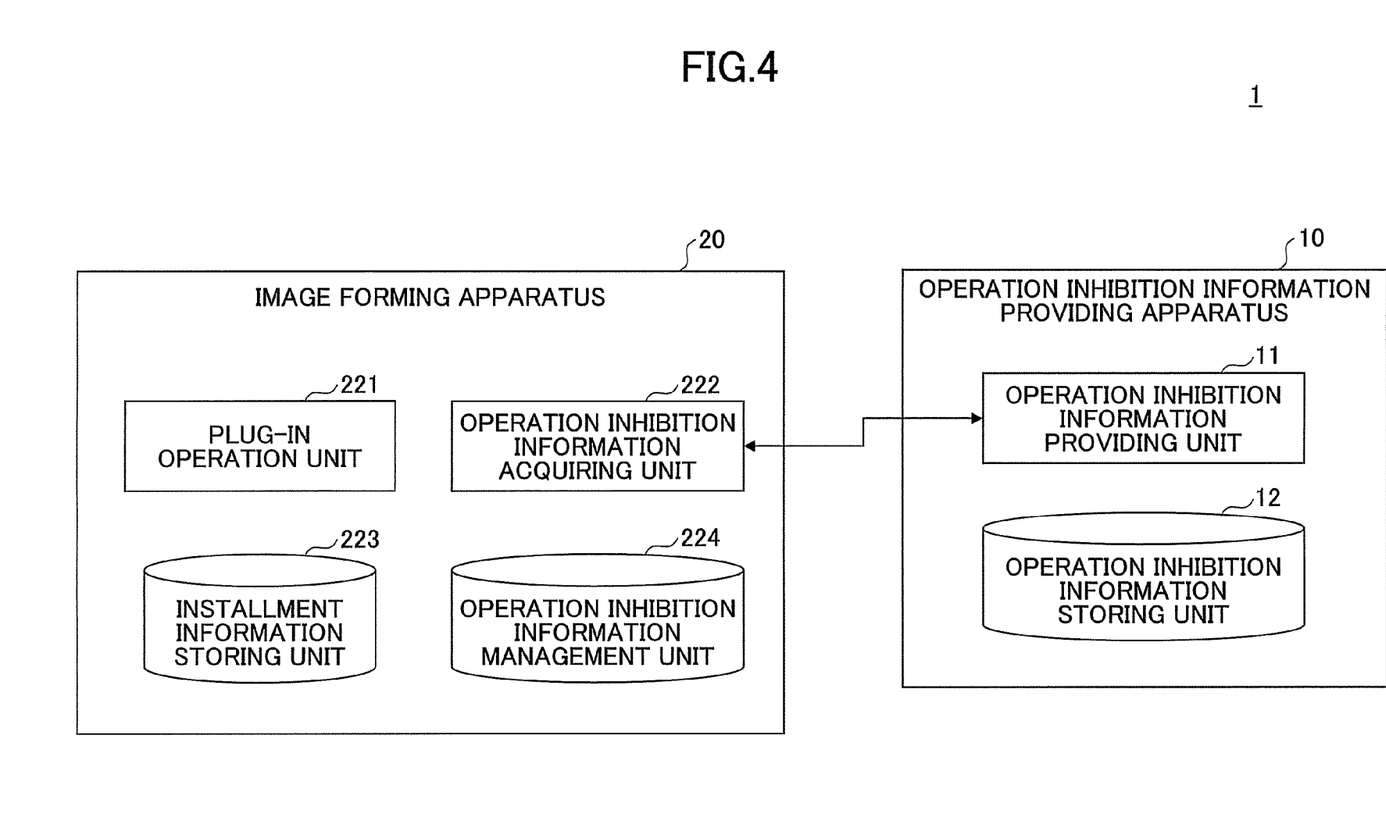
FIG. 4 is a drawing illustrating an example of the functional configuration of the operation inhibiting system according to a first embodiment.

FIG. 4 is a drawing illustrating an example of the functional configuration of the operation inhibiting system according to a first embodiment. In FIG. 4, the image forming apparatus 20 includes a plug-in operation unit 221, an operation inhibition information acquiring unit 222, an installment information storing unit 223, and an operation inhibition information management unit 224. These units are implemented as processes performed by the CPU 211 when the CPU 211 executes the programs installed in the image forming apparatus 20.

The plug-in operation unit 221 performs, in response to a user request, a configuration modify operation such as installing, uninstalling, or modifying a program package (hereinafter referred to simply as "package") that can be added as a plug-in. Here, the term "package" refers to an archive file that stores one or more program modules, each of which is a program code for implementing a certain function. The package not only stores programs modules but also stores a file (hereinafter referred to as "package attribute file") that store package attribute information. When a package is installed, the plug-in operation unit 221 stores the attribute information of the package attribute file of this package in the installment information storing unit 223. When a package is uninstalled, the plug-in operation unit 221 removes the attribute information of this package from the installment information storing unit 223. When a package is updated, the plug-in operation unit 221 updates the attribute information of this package stored in the installment information storing unit 223.

The installment information storing unit 223 stores therein a list of attributes (hereinafter referred to as "installment information") with respect to the packages installed in the image forming apparatus 20 (i.e., available packages). The installment information storing unit 223 utilizes a portion of the recording area of the HDD 214 to store the installment information.

The operation inhibition information acquiring unit 222 requests the operation inhibition information providing apparatus 10 to provide operation inhibition information, and, then, receives the operation inhibition information from the operation inhibition information providing apparatus 10. The operation inhibition information acquiring unit 222 stores the acquired operation inhibition information in the operation inhibition information management unit 224. The operation inhibition information management unit 224 utilizes a portion of the recording area of the HDD 214 to store (and manage) the operation inhibition information.

The plug-in operation unit 221 determines whether to allow a configuration modify operation requested by a user to be performed, based on the operation inhibition information managed by the operation inhibition information management unit 224.

The operation inhibition information providing apparatus 10 includes an operation inhibition information providing unit 11 and an operation inhibition information storing unit 12. These units are implemented as processes performed by the CPU 104 when the CPU 104 executes the programs installed in the operation inhibition information providing apparatus 10.

In response to the request from the operation inhibition information acquiring unit 222, the operation inhibition information providing unit 11 obtains, from the operation inhibition information storing unit 12, operation inhibition information suitable for the image forming apparatus 20 that has issued the request. The operation inhibition information providing unit 11 then sends the operation inhibition information to the operation inhibition information acquiring unit 222. The operation inhibition information storing unit 12 utilizes the auxiliary storage device 102, for example, to store operation inhibition information suitable for each package on a package-specific basis with respect to the packages installed in the image forming apparatuses 20.

Figure 5:
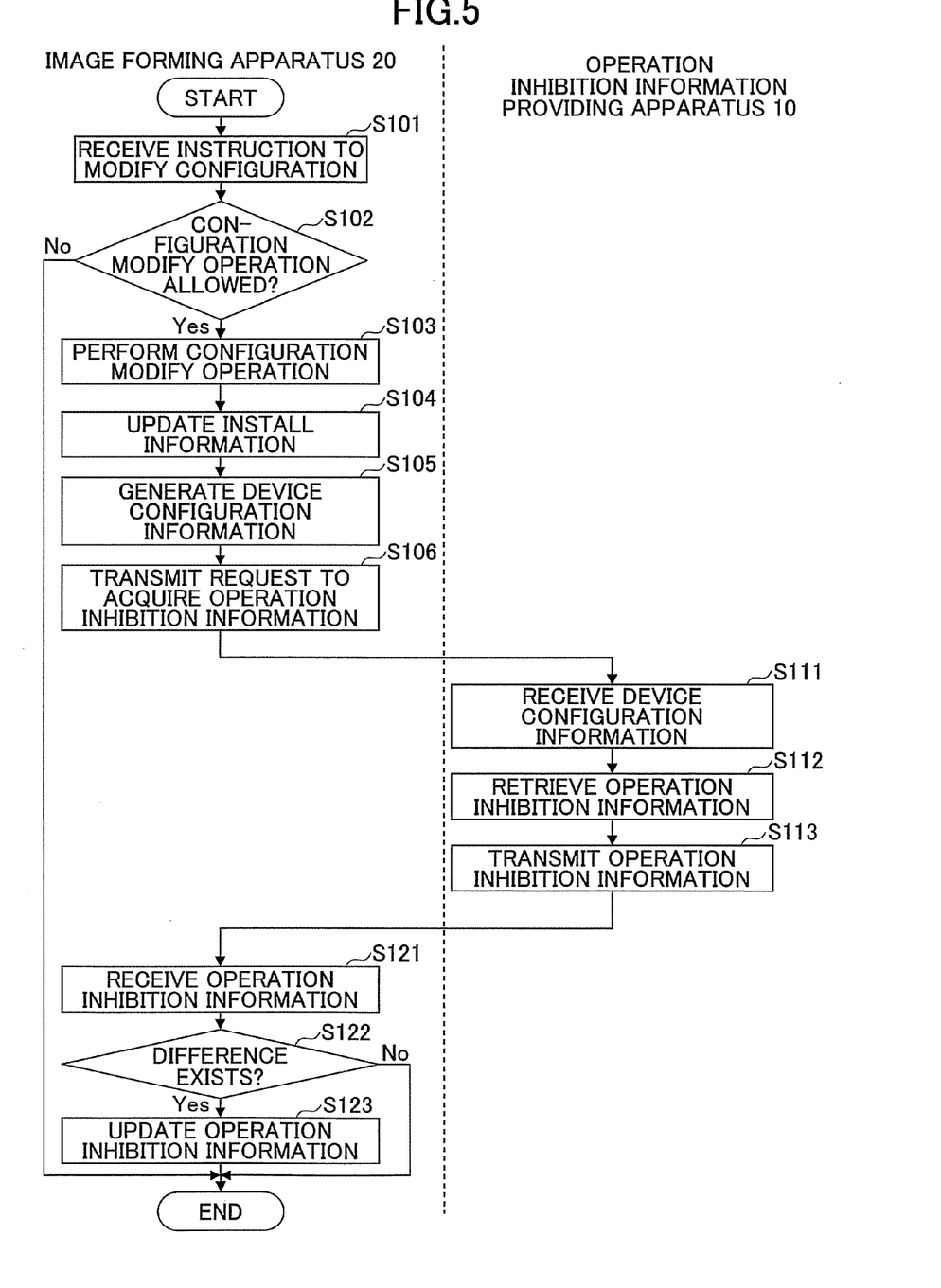
FIG. 5 is a drawing illustrating an example of a procedure performed by the operation inhibiting system according to the first embodiment.

In the following, an operation procedure performed by the operation inhibiting system 1 will be described. FIG. 5 is a drawing illustrating an example of a procedure performed by the operation inhibiting system according to the first embodiment.

An operation request, which may be a request to install (i.e., add) a package, uninstall (i.e., remove) a package, or modify a package, is entered by a user through a screen displayed on the operation panel 25 (S101). In response to the request, the plug-in operation unit 221 checks whether the requested operation is allowed to be performed, based on the operation inhibition information stored in the operation inhibition information management unit 224 (S102).

Figure 6:
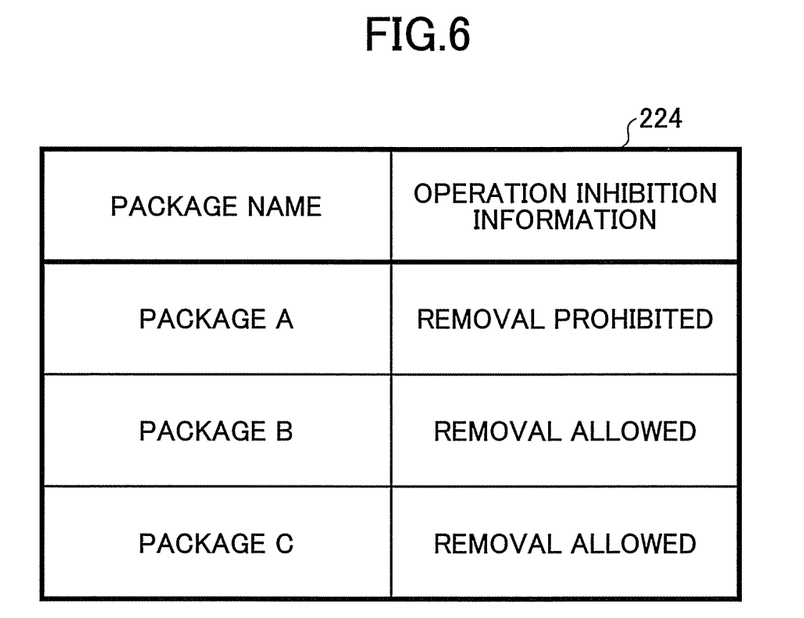
FIG. 6 is a drawing illustrating an example of the configuration of the operation inhibition information management unit.

FIG. 6 is a drawing illustrating an example of the configuration of the operation inhibition information management unit. As illustrated in FIG. 6, the operation inhibition information management unit 224 stores operation inhibition information on a package-specific basis. In the present embodiment, the packages stored in the operation inhibition information management unit 224 are limited to those installed in the image forming apparatus 20. Accordingly, the operation inhibition information only indicates whether a given package can be uninstalled (i.e., removed) or modified. In FIG. 6, the package A is indicated as "removal prohibited" (i.e., uninstall prohibited), and packages B and C are indicated as "removal allowed". It should be noted, however, that the operation inhibition information stored in the operation inhibition information management unit 224 is not limited to the packages installed in the image forming apparatus 20. In such a case, the operation inhibition information may indicate whether a package is allowed to be installed with respect to uninstalled packages.

When the configuration modify operation requested by the user is indicated as prohibited in the operation inhibition information management unit 224 (No in S102), the plug-in operation unit 221 ends the procedure of FIG. 5 without performing the requested operation. For example, uninstalling the package A is prohibited in the operation inhibition information management unit 224. In this case, thus, the package A is not uninstalled upon receiving a request to uninstall the package A.

When the configuration modify operation requested by the user is indicated as allowed or is not indicated as prohibited in the operation inhibition information management unit 224 (Yes in S102), the plug-in operation unit 221 performs the requested configuration modify operation (S103). For example, installing a package D is not prohibited in the operation inhibition information management unit 224. Upon a request to install the package D, therefore, the package D is installed.

The plug-in operation unit 221 then reflects the changes made by the configuration modify operation in the installment information storing unit 223 (S104).

Figure 7:
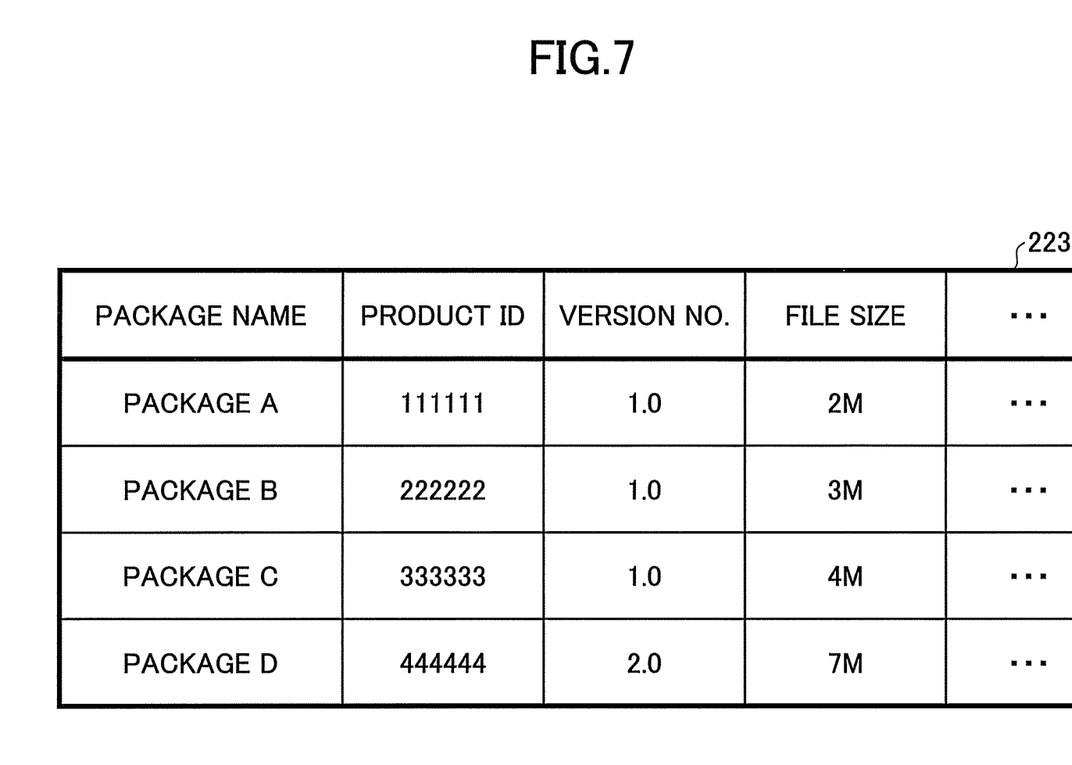
FIG. 7 is a drawing illustrating an example of the configuration of the installment information storing unit.

FIG. 7 is a drawing illustrating an example of the configuration of the installment information storing unit. In FIG. 7, attribute information is stored on a package-specific basis in the installment information storing unit 223 with respect to the packages installed in the image forming apparatus 20. Namely, the installment information storing unit 223 stores configuration information regarding the packages installed in the image forming apparatus 20. In FIG. 7, the attribute information includes a package name, a product ID, a version number, a file size, etc. The package name is a name assigned to each package. The product ID is an identifier (ID) assigned to each package. It may be noted that the operation inhibition information management unit 224 may specify the product ID in place of the package name. The version number indicates which version the package is. The file size is the size of the package. Other types of information may also be included in the attribute information.

FIG. 7 illustrates an example in which the package D is newly installed, and attribute information about the package D is newly added. The attribute information about the package D is extracted from the package attribute file of the package D to be stored in the installment information storing unit 223.

The operation inhibition information acquiring unit 222 uses the installment information storing unit 223 to generate device configuration information (S105).

Figure 8:
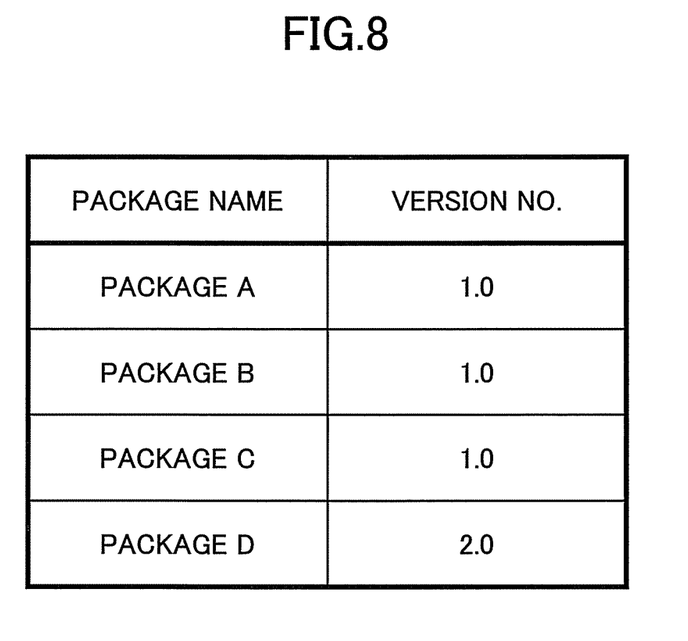
FIG. 8 is a drawing illustrating an example of the device configuration information.

FIG. 8 is a drawing illustrating an example of the device configuration information. As illustrated in FIG. 8, the device configuration information includes a package name and version number extracted from the installment information storing unit 223 separately for each package. Namely, the device configuration information includes the package names and version numbers of all the packages installed in the image forming apparatus 20. It may be noted that the device configuration information may specify a product ID in place of a package name.

The operation inhibition information acquiring unit 222 transmits a request to acquire operation inhibition information to the operation inhibition information providing apparatus 10 (S106). This acquisition request includes the generated device configuration information.

The operation inhibition information providing unit 11 of the operation inhibition information providing, apparatus 10 receives the operation inhibition information acquisition request (S111). The operation inhibition information providing unit 11 then retrieves the operation inhibition information corresponding to the device configuration information included in the acquisition request from the operation inhibition information storing unit 12 (S112).

Figure 9:
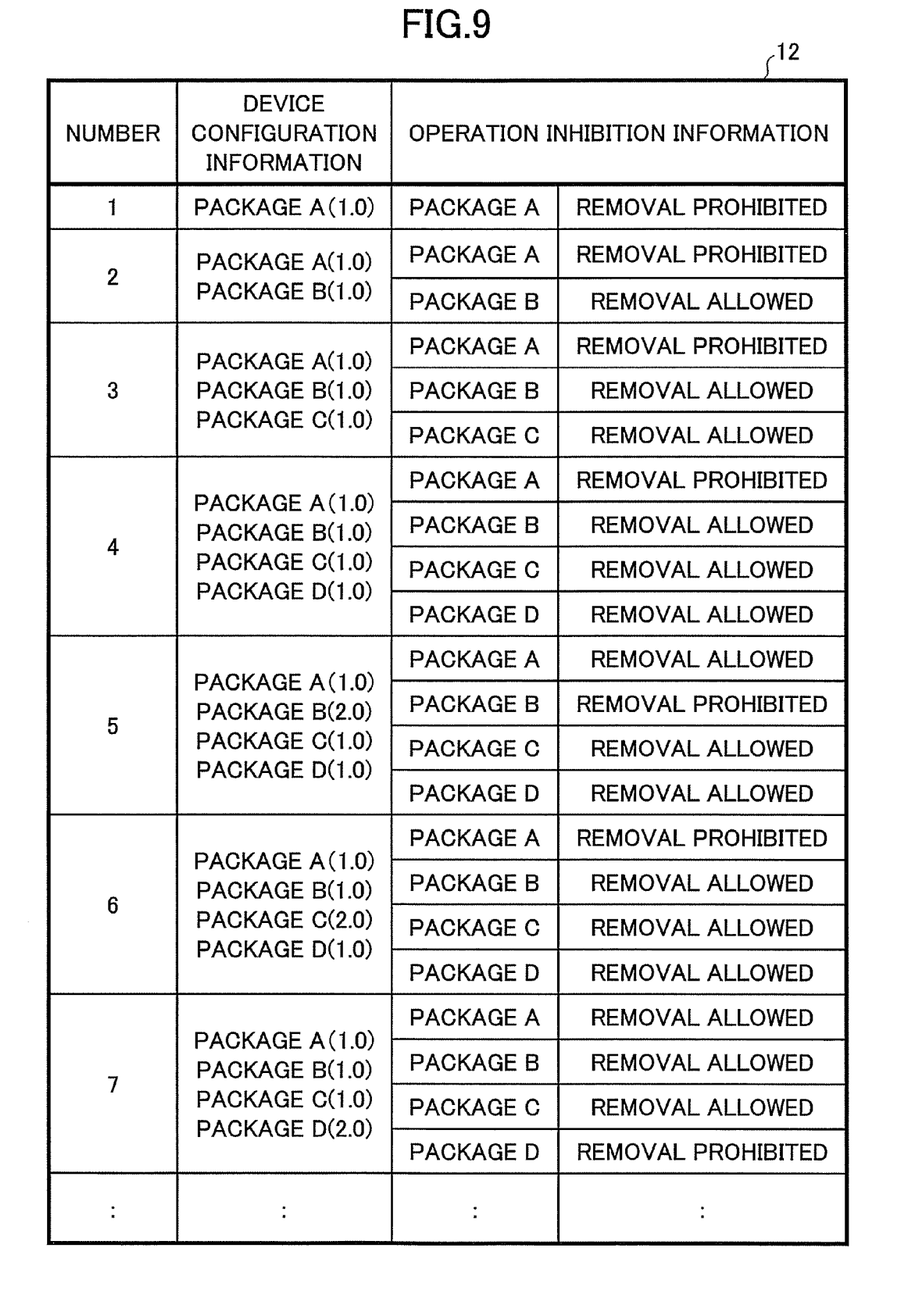
FIG. 9 is a drawing illustrating an example of the configuration of the operation inhibition information storing unit.

FIG. 9 is a drawing illustrating an example of the configuration of the operation inhibition information storing unit. In FIG. 9, the operation inhibition information storing unit 12 stores operation inhibition information on a device-configuration-information-specific basis (i.e., separately for each device configuration information), such that the operation inhibition information is suitable for the configuration specified by the corresponding device configuration information. The column that lists numbers is provided for the purpose of identifying each record for the sake of convenience of explanation.

In the example illustrated in FIG. 9, the operation inhibition information of record 1 is retrieved when only the package A (1.0) is installed in the image forming apparatus 20, i.e., when only the package A (1.0) is included in the device configuration information. Here, the number in the parentheses is a version number. Similarly, the operation inhibition information of record 2 is retrieved when only the package A (1.0) and the package B (1.0) are installed in the image forming apparatus 20. The device configuration information illustrated in FIG. 8 corresponds the device configuration information of record 7 in FIG. 9. In the example of the present embodiment, thus, the operation inhibition information of record 7 is retrieved.

The example of the present embodiment is directed to a case in which the operation inhibition information is retrieved from the record that specifies the device configuration information fully matching the device configuration information received from the image forming apparatus 20. When such a complete match is required, however, there may be a need to store operation inhibition information for all the package combinations (i.e., all the possible package combinations). In consideration of this, some of the packages contained in device configuration information stored in the operation inhibition information storing unit 12 may allow the use of wild-card characters. Alternatively, provision may be made such as to retrieve operation inhibition information corresponding to the device configuration information that is the closest to the received device configuration information. The term "closest" means that the extent of matches in the types of packages (which take into account version numbers) is highest. In the case of versions being different, the extent of matches may be decreased when a difference in version numbers increases.

Operation inhibition information responsive to device configuration information may be set based on interdependency between the packages contained in the device configuration information. At least a package that is depended upon by another package is set to "uninstall prohibited" (i.e., "removal prohibited"). Further, operation inhibition information may be set based on other factors in addition to interdependency. For example, a package that the maker of the image forming apparatus 20 does not wish to be uninstalled by a user for the reasons related to its business operation may be indicated as "removal prohibited". Interdependency between packages is known to an operator who creates or edits the operation inhibition information storing unit 12. For example, the package attribute file of a given package specifies interdependency data that specifies a package name or product ID of a package on which this given package depends. The operator makes a setting to the operation inhibition information storing unit 12 based on such interdependency data. In the example illustrated in FIG. 9, whether a given package is removable varies depending on version numbers of packages as in the case of records 4 through 7. This is because interdependency between packages may change in response to the updating of a package.

Further, the contents of the operation inhibition information storing unit 12 may be modified in response to checking the properness of system operations of the image forming apparatus 20 or in response to a user request or the like. For example, it may turn out that a proper operation is guaranteed without the presence of a certain package. In this case, modification is made to indicate this package as removable.

The operation inhibition information providing unit 11 transmits the retrieved operation inhibition information to the operation inhibition information acquiring unit 222 of the image forming apparatus 20 (S113).

The operation inhibition information acquiring unit 222 receives the transmitted operation inhibition information (S121). The operation inhibition information acquiring unit 222 then checks whether there is a difference between the received operation inhibition information and the operation inhibition information stored in the operation inhibition information management unit 224 (S122). When there is a difference (Yes in S122), the operation inhibition information acquiring unit 222 overwrites a relevant portion of the operation inhibition information management unit 224 with the received operation inhibition information (S123). Namely, the operation inhibition information stored in the operation inhibition information management unit 224 is updated to the received operation inhibition information. When there is no difference (No in S122), the updating of the operation inhibition information management unit 224 is not performed. Alternatively, the received operation inhibition information may always be stored in the operation inhibition information management unit 224 without checking whether there is a difference. Further, the operation inhibition information providing apparatus 10 may check whether there is a difference. In this case, the operation inhibition information acquisition request includes operation inhibition information stored in the operation inhibition information management unit 224. The operation inhibition information providing unit 11 compares the received operation inhibition information with the operation inhibition information retrieved from the operation inhibition information storing unit 12 to check whether there is a difference. Upon detecting a difference, the operation inhibition information providing unit 11 transmits the operation inhibition information retrieved from the operation inhibition information storing unit 12. Upon detecting no difference, the operation inhibition information providing unit 11 transmits information indicative of no need for update.

The processes in step S105 and the subsequent steps may be performed at the time of power-on of the image forming apparatus 20. Alternatively, these processes may automatically be performed periodically. In such a case, new operation inhibition information can be promptly provided to the image forming apparatus 20 even when there is no change in the device configuration information. This happens when the maker modifies the operation inhibition information.

Further, a special operation inhibition information storing unit 12 may be provided for a specific user (i.e., a specific image forming apparatus 20). This may serve to prohibit or allow a particular operation for this user in accordance with a user request. In this case, the request to acquire operation inhibition information may specify an ID (e.g., serial number) for identifying the image forming apparatus 20. In the operation inhibition information providing apparatus 10, the operation inhibition information storing unit 12 may be linked with a specific serial number.

As described above, the operation inhibition information providing apparatus 10 manages all the operation inhibition information responsive to device configuration information in the operation inhibiting system 1 of the first embodiment. The image forming apparatus 20 acquires the operation inhibition information corresponding to device configuration information from the operation inhibition information providing apparatus 10, and, then, checks whether a configuration modify operation is allowed based on the acquired operation inhibition information. Accordingly, various configuration modify operations with respect to packages can be properly inhibited or restricted. This prevents the operating environment of the image forming apparatus 20 from being carelessly destroyed.

In the image forming apparatus 20, the operation inhibition information management unit 224 manages all the operation inhibition information corresponding to each package in an integrated manner. Accordingly, the updating of operation inhibition information can be more easily performed compared with the case in which operation inhibition information is attached to each package (i.e., contained in each package). When operation inhibition information is attached separately to each package, a change in the operation inhibition information of a given package results in the need to update this package. When operation inhibition information is managed in an integrated manner for all the packages as in the present embodiment, operation inhibition information can be updated without updating an individual package.

In the following, a second embodiment will be described. With respect to the second embodiment, a description will be given of those points which are different from the first embodiment. Other points which are not described are the same as in the first embodiment.

Figure 10:
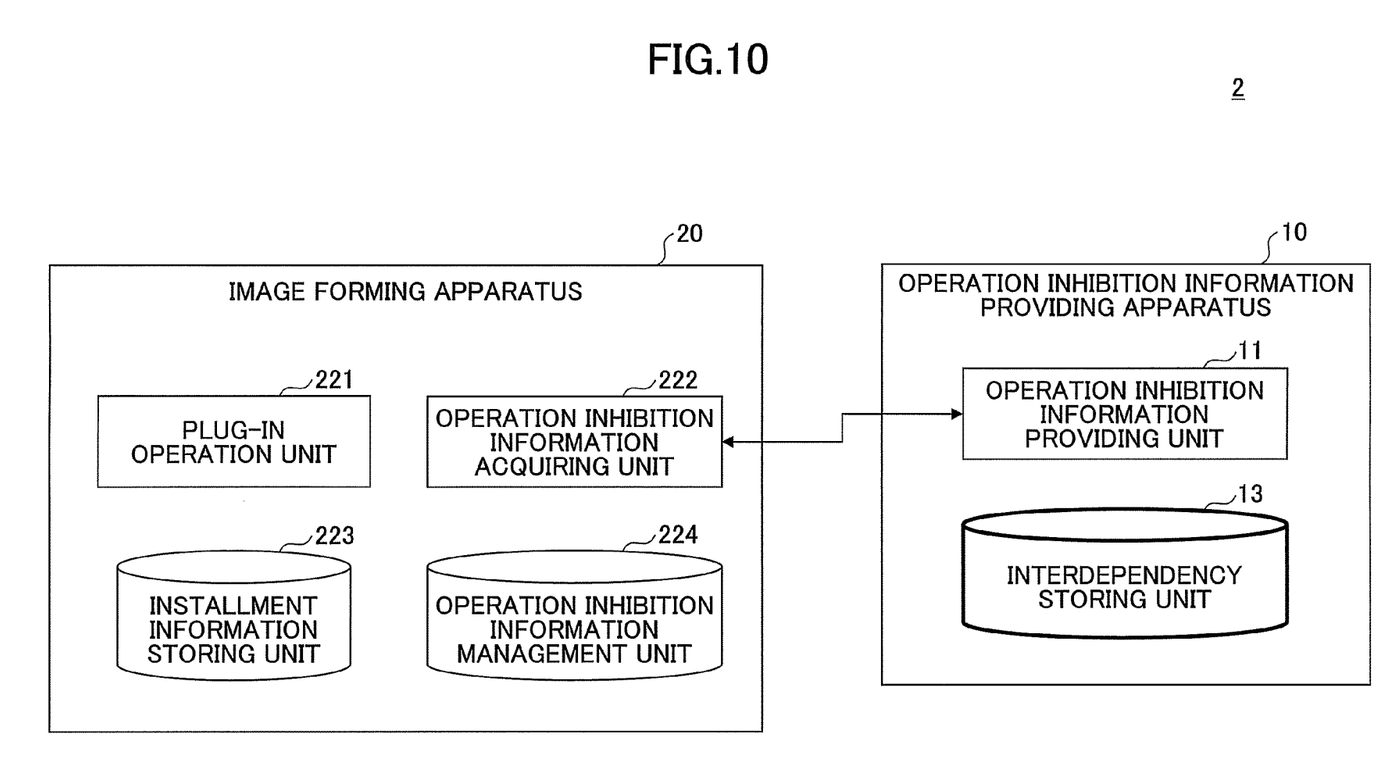
FIG. 10 is a drawing illustrating an example of the functional configuration of the operation inhibiting system according to a second embodiment.

FIG. 10 is a drawing illustrating an example of the functional configuration of the operation inhibiting system according to the second embodiment. In FIG. 10, the same elements as those of FIG. 4 are referred to by the same numerals, and a description thereof will be omitted.

In FIG. 10, an interdependency storing unit is provided in place of the operation inhibition information storing unit 12 in the operation inhibition information providing apparatus 10. The interdependency storing unit 13 stores data indicative of interdependencies between packages by use of the auxiliary storage device 102, for example.

Figure 11:
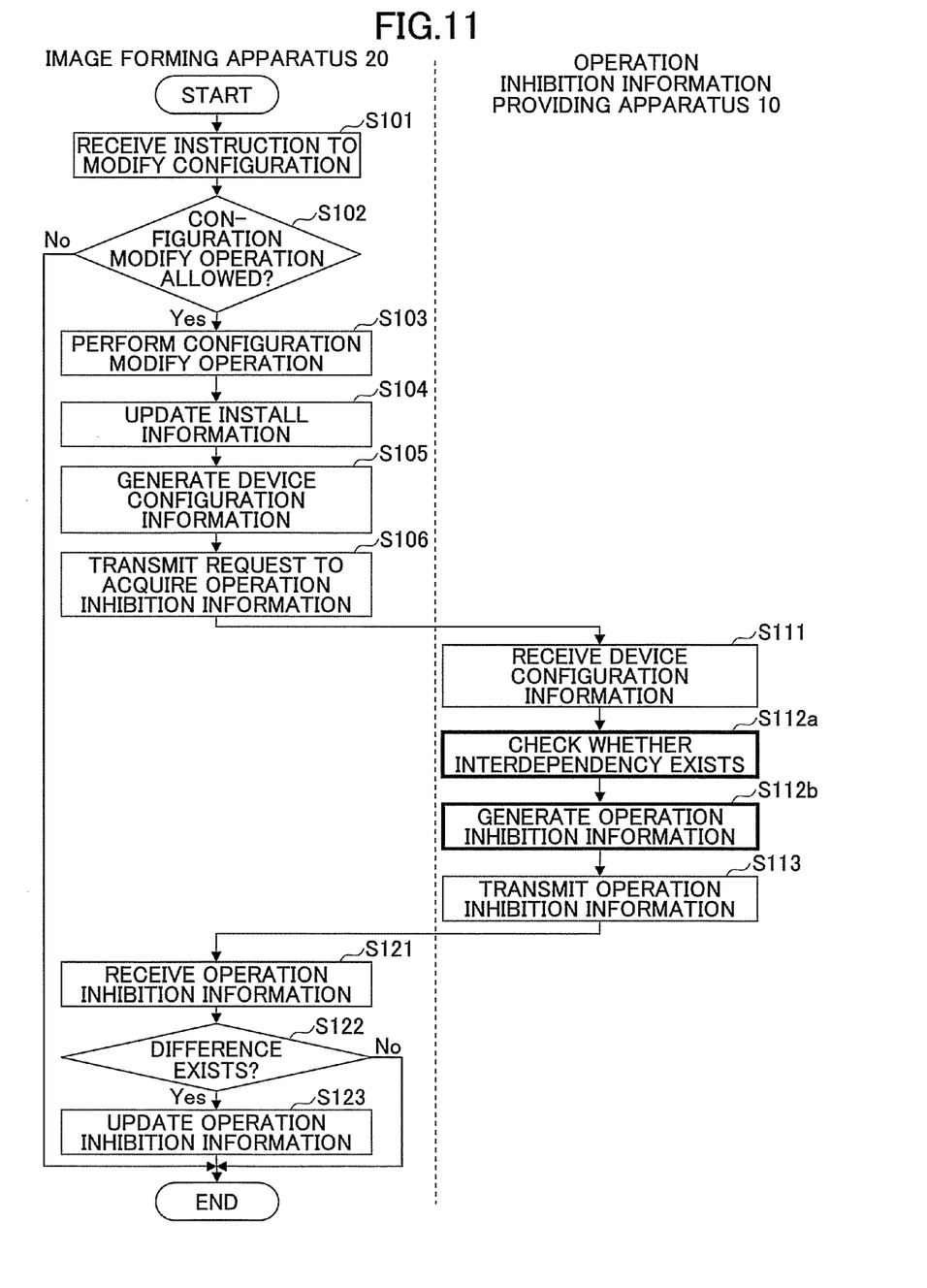
FIG. 11 is a drawing illustrating an example of a procedure performed by the operation inhibiting system according to the second embodiment.

In the following, an operation procedure performed by the operation inhibiting system 2 will be described. FIG. 11 is a drawing illustrating an example of a procedure performed by the operation inhibiting system according to the second embodiment. In FIG. 11, the same steps as those of FIG. 5 are referred to by the same step numbers, and a description thereof will be omitted.

In FIG. 11, steps S112a and S112b are performed in place of step S112. The operation inhibition information providing unit 11 of the operation inhibition information providing apparatus 10 checks, based on the received device configuration information and the interdependency storing unit 13, whether interdependency exists between packages specified in the device configuration information.

Figure 12:
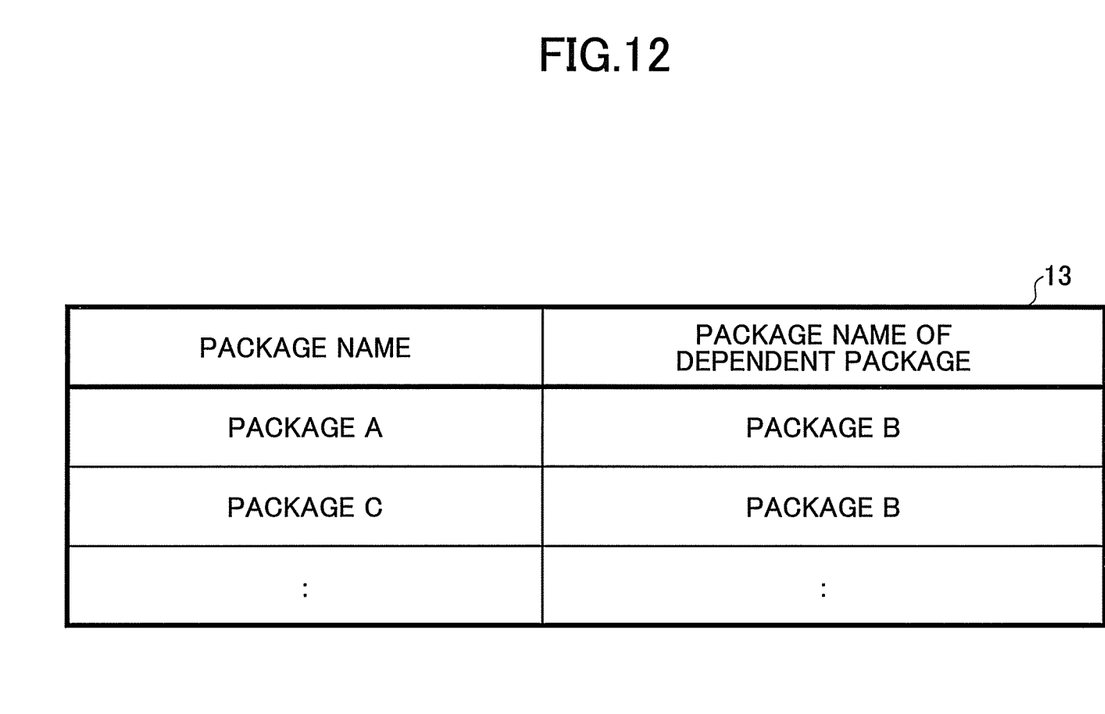
FIG. 12 is a drawing illustrating an example of the configuration of an interdependency storing unit.

FIG. 12 is a drawing illustrating an example of the configuration of the interdependency storing unit. In FIG. 12, the interdependency storing unit 13 stores a package name of a given package that depends on another package, and also stores a package name of the package that is depended upon by this given package. Such package name pair is stored separately for each package that depends on another package. In the example illustrated in FIG. 12, the package A and the package C depend on the package B. Plural package names of packages that are depended upon may be stored for one package name. It may be noted that a product ID may be used in place of a package name.

In step S112a, the operation inhibition information providing unit 11 checks whether any package contained in the received device configuration information is indicated as a package that is depended upon by another package in the interdependency storing unit 13.

The operation inhibition information providing unit 11 then generates operation inhibition information based on the results of the check of interdependency (S112b). Specifically, a package that is depended upon by another package is indicated as "removal prohibited" and "update prohibited" in the generated operation inhibition information. In the example of FIG. 12, thus, the package B is indicated as "removal prohibited" and "update prohibited".

The procedure that follows is the same as the one described in connection with FIG. 5.

As described above, operation inhibition information is automatically generated based on the interdependency storing unit 13 according to the second embodiment. This lowers the need to set operation inhibition information separately for each device configuration information in advance.

Further, the present invention is not limited to these embodiments, but various variations and modifications may be made without departing from the scope of the present invention.

The present application is based on Japanese priority application No. 2009-298671 filed on Dec. 28, 2009, with the Japanese Patent Office, the entire contents of which are hereby incorporated by reference.

What is claimed is:

1. An operation inhibiting system, comprising:
   an image forming apparatus in which one or more programs are installed; and
   an operation inhibition information providing apparatus,
   wherein the image forming apparatus includes:
   a configuration information storing unit to store configuration information about the one or more installed programs;
   an operation inhibition information acquiring unit to transmit the configuration information to the operation inhibition information providing apparatus, and to receive operation inhibition information that is transmitted from the operation inhibition information providing apparatus in response to the transmitted configuration information, the operation inhibition information including one or more inhibition indications that are selected to correspond to the one or more installed programs included in the transmitted configuration information, each of the one or more inhibition indications indicating on a program-specific basis whether an operation to modify a configuration of a corresponding one of the one or more installed programs is allowed; and
   an operation unit to receive a request to perform an operation on a program that is one of the one or more installed programs, and to determine, based on the received operation inhibition information, whether the requested operation is performable,
   wherein the operation inhibition information providing apparatus includes an operation inhibition information providing unit that transmits the operation inhibition information including the one or more inhibition indications that are selected to correspond to the one or more installed programs included in the configuration information received from the image forming apparatus.

2. The operation inhibiting system as claimed in claim 1, wherein the operation inhibition information providing apparatus further includes an operation inhibition information storing unit that stores the operation inhibition information responsive to the configuration information, and the operation inhibition information providing unit retrieves the operation inhibition information responsive to the received configuration information from the operation inhibition information storing unit to transmit the retrieved operation inhibition information to the image forming apparatus.

3. The operation inhibiting system as claimed in claim 1, wherein the operation inhibition information providing apparatus further includes an interdependency storing unit that stores interdependency between the one or more programs, and wherein the operation inhibition information providing unit generates the operation inhibition information indicating that the operation is not allowed with respect to a program that is depended upon by another program among the one or more programs included in the received configuration information according to the interdependency storing unit, and transmits the generated operation inhibition information to the image forming apparatus.

4. The operation inhibiting system as claimed in claim 1, wherein the operation inhibition information acquiring unit stores the received operation inhibition information in operation inhibition information management unit, and the operation inhibition information management unit manages the operation inhibition information with respect to the one or more installed programs in an integrated manner.

5. An operation inhibiting method in an operation inhibiting system including an operation inhibition information providing apparatus and an image forming apparatus in which one or more programs are installed, comprising:

transmitting, by the image forming apparatus, configuration information about the one or more installed programs stored in a configuration information storing unit to the operation inhibition information providing apparatus;

receiving, by the image forming apparatus, operation inhibition information that is transmitted from the operation inhibition information providing apparatus in response to the configuration information, the operation inhibition information including one or more inhibition indications that are selected to correspond to the one or more installed programs included in the transmitted configuration information, each of the one or more inhibition indications indicating on a program-specific basis whether an operation to modify a configuration of a corresponding one of the one or more installed programs is allowed;

determining, in the image forming apparatus, upon receiving a request to perform an operation on a program that is one of the one or more installed programs, whether the requested operation is performable based on the received operation inhibition information; and transmitting, by the operation inhibition information providing apparatus, the operation inhibition information including the one or more inhibition indications that are selected to correspond to the one or more installed programs included in the configuration information received from the image forming apparatus.

* * * * *